US010620724B1

(12) United States Patent
Vukovic et al.

(10) Patent No.: US 10,620,724 B1
(45) Date of Patent: Apr. 14, 2020

(54) PRESSURE-SENSITIVE AUTHENTICATION

(71) Applicant: International Business Machines Corporation, Armonk, NY (US)

(72) Inventors: Maja Vukovic, New York, NY (US); James R. Kozloski, New Fairfield, CT (US); Rhonda L. Childress, Austin, TX (US); Itzhack Goldberg, Hadera (IL); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/200,234

(22) Filed: Nov. 26, 2018

(51) Int. Cl.
*G06F 3/038* (2013.01)
*G01L 5/00* (2006.01)
*G06F 21/31* (2013.01)

(52) U.S. Cl.
CPC ............ *G06F 3/038* (2013.01); *G01L 5/0038* (2013.01); *G06F 21/316* (2013.01)

(58) Field of Classification Search
None
See application file for complete search history.

(56) References Cited

U.S. PATENT DOCUMENTS

| 6,509,847 | B1 | 1/2003 | Anderson |
| 7,827,592 | B2 | 11/2010 | Fifer et al. |
| 8,749,361 | B2 | 6/2014 | Najafi et al. |
| 8,908,894 | B2 | 12/2014 | Amento et al. |
| 9,807,852 | B1 | 10/2017 | Starner et al. |
| 9,990,041 | B2 | 6/2018 | Levesque et al. |

(Continued)

FOREIGN PATENT DOCUMENTS

JP  2016528582  9/2016

OTHER PUBLICATIONS

Schwarz et al., "Cord Input: An Intuitive, High-Accuracy, Multi-Degree-of-Freedom Input Method for Mobile Devices," Proceedings of the SIGCHI Conference on Human Factors in Computing Systems ACM, Apr. 2010, 4 pages.

(Continued)

*Primary Examiner* — Daniell L Negron
(74) *Attorney, Agent, or Firm* — Amin, Turocy & Watson, LLP

(57) ABSTRACT

In one or more embodiments described herein, device, computer-implemented methods, and/or computer program products that facilitate biometric authentication. According to an embodiment, a device can comprise a memory that stores computer executable components and a processor that executes the computer executable components. The computer executable components can comprise a sensor component comprising one or more pressure sensors and that measures pressure. The computer executable components can further comprise a pressure processing component that determines a first pressure sequence employed to authenticate the device, wherein the first pressure sequence is determined based on a pressure applied at the one or more pressure sensors. The computer executable components can further comprise an authentication component that authenticates the first pressure sequence by determining that the first pressure sequence matches an authentication pressure sequence.

20 Claims, 9 Drawing Sheets

(56) References Cited

U.S. PATENT DOCUMENTS

| | | |
|---|---|---|
| 10,013,094 B1 | 7/2018 | Smith |
| 2006/0062382 A1 | 3/2006 | Ronkainen |
| 2009/0249476 A1 | 10/2009 | Seacat |
| 2011/0246028 A1 | 10/2011 | Lisseman et al. |
| 2012/0126941 A1 | 5/2012 | Coggill |
| 2013/0091543 A1* | 4/2013 | Wade ............... G06F 21/54 726/1 |
| 2013/0181902 A1 | 7/2013 | Hinckley et al. |
| 2014/0292396 A1 | 10/2014 | Bruwer et al. |
| 2015/0234477 A1 | 8/2015 | Abovitz et al. |
| 2016/0179199 A1 | 6/2016 | Evesque et al. |
| 2016/0294835 A1 | 10/2016 | Beaumont et al. |
| 2016/0317267 A1 | 11/2016 | Meerbeek et al. |
| 2016/0342971 A1 | 11/2016 | Hulbert et al. |

OTHER PUBLICATIONS

"USB Flash Drive Security," https://en.wikipedia.org/wiki/Usb_flash_drive_security, 1 page.

"Secure Grip," https://web.archive.org/web/20061009210426/http://www.sas.el.utwente.nl/home/SecureGrip/, 2 pages.

Veldhuis, et al., "Biometric verification based on grip-pattern recognition," 2004, https://ut.on.worldcat.org/search?queryString=Biometric+verification+based+on+grip-pattern+recognition#/oclc/199408073, 8 pages.

Office Action for U.S. Appl. No. 16/781,045 dated Mar. 5, 2020, 17 pages.

* cited by examiner

PRESSURE-SENSITIVE AUTHENTICATION

BACKGROUND

The subject disclosure relates generally to authentication, and more particularly, pressure-sensitive authentication systems, computer-implemented methods and computer program products.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate the pressure-sensitive authentication system.

According to an embodiment, a device can comprise a memory that stores computer executable components and a processor that executes the computer executable components stored in the memory. The computer executable components can comprise a sensor component comprising one or more pressure sensors that measure a pressure. The computer executable components can further comprise a pressure processing component that determines a first pressure sequence employed to authenticate the device, where the first pressure sequence is determined based on a pressure applied at the one or more pressure sensors. The computer executable components can further comprise an authentication component that authenticates the first pressure sequence by determining that the first pressure sequence matches an authentication pressure sequence.

According to another embodiment, a computer-implemented method can comprise measuring, by a sensor component having one or more pressure sensors and operatively coupled to a processor, a pressure. The computer-implemented method can further comprise determining, by a pressure processing component operatively coupled to the processor, a first pressure sequence employed to authenticate a device, where the first pressure sequence is determined based on the pressure applied at the one or more pressure sensors. The computer-implemented method can further comprise authenticating, by an authentication component operatively coupled to the processor, the first pressure sequence by determining that the first pressure sequence matches an authentication pressure sequence.

According to another embodiment, a computer program product for authenticating a device by measuring pressure applied on the device, the computer program product comprising a computer readable storage medium having program instructions embodied therewith, the program instructions executable by a processor to cause the processor to measure pressure, by the processor, employing one or more pressure sensors; determine, by the processor, a first pressure sequence employed to authenticate the device, where the first pressure sequence is determined based on the pressure applied at the sensor component; and authenticate, by the processor, the first pressure sequence by determining that the first pressure sequence matches an authentication pressure sequence.

DETAILED DESCRIPTION

The following detailed description is merely illustrative and is not intended to limit embodiments and/or applications or uses of embodiments. Furthermore, there is no intention to be bound by any expressed or implied information presented in the preceding Summary section, or in the Detailed Description section.

A pressure-sensitive authentication system is described herein that provides authentication via a pressure password (e.g., a sequence of presses and/or squeezes applied by an entity). For example, a device, such as a universal bus serial (USB), can be employed to provide authentication via pressure password. The pressure password can be a primary security measure or as a secondary security measure (e.g., for two password system). In some embodiments, using the pressure password as secondary security measure can provide increase confidence level for protecting data on the device or other systems connected to the device. The biometrics pressure-sensitive authentication system according to some embodiments described herein can allow for more complex authentications. For example, the access to data can differentiate when the USB is plugged into a computer, memory or electronic device (e.g., pressure password provided while entity connected to a computer) versus when the USB is not plugged into any device (e.g., pressure password provided while entity holding the device in hand).

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Figure 1A:
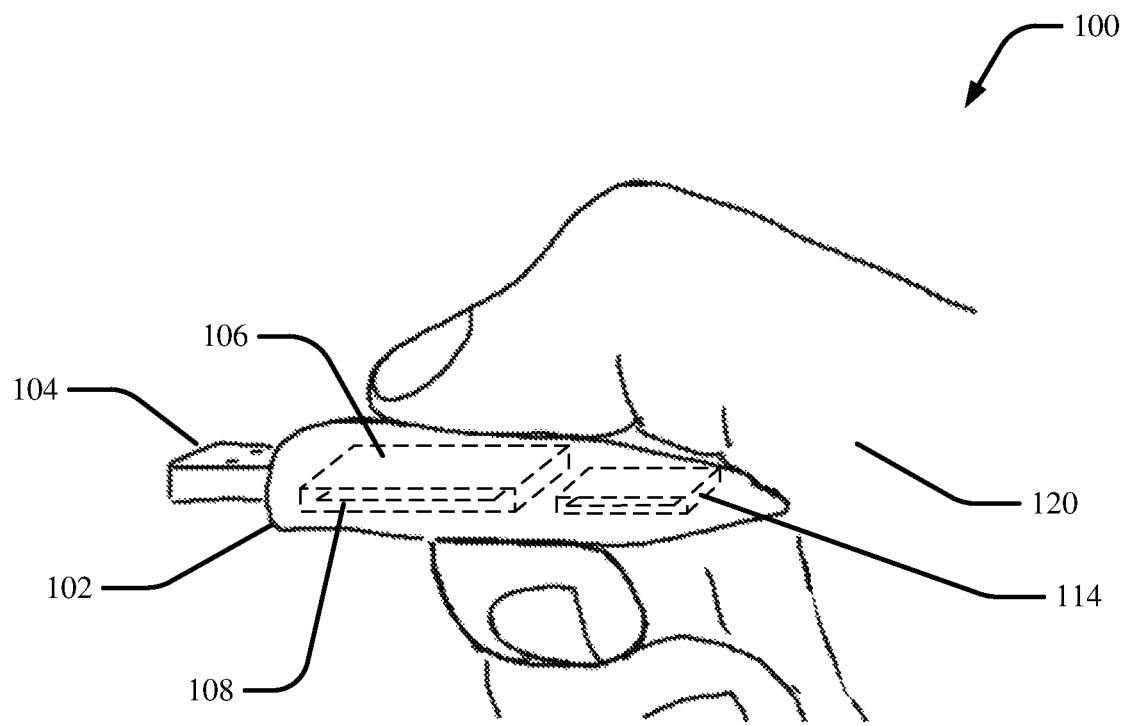
FIG. 1A illustrates an example, non-limiting a pressure-sensitive device in accordance with one or more embodiments described herein.

FIG. 1A illustrates an example, non-limiting a pressure-sensitive authentication system 100 in accordance with one or more embodiments described herein. Repetitive description of like elements employed in respective embodiments is omitted for sake of brevity. According to some embodiments, a pressure-sensitive authentication system 100 can comprise a pressure-sensitive device 102 (e.g., USB) that can be held or controlled by an entity 120 (also referred to as "user"). As used herein, the entity can be a machine, human, animal or otherwise. The pressure-sensitive device 102 can be constructed to allow the entity 120 to apply pressure while holding the pressure-sensitive device 102. In some embodiments, the pressure-sensitive device 102 comprises a connector 104, a sensor module 106 and storage module 114. In some embodiments, a storage module 114 can comprise one or more hardware components (not shown), for example, but not limited to, flash memory, transistors, resistors and/or processor formed on a substrate to perform functions of adding, securing, accessing, and/or removing data. In some embodiments, the pressure-sensitive device 102 can include components to connect to various electronic devices (e.g., a computer or server, not shown for sake of brevity) through the connector 104.

Figure 3:
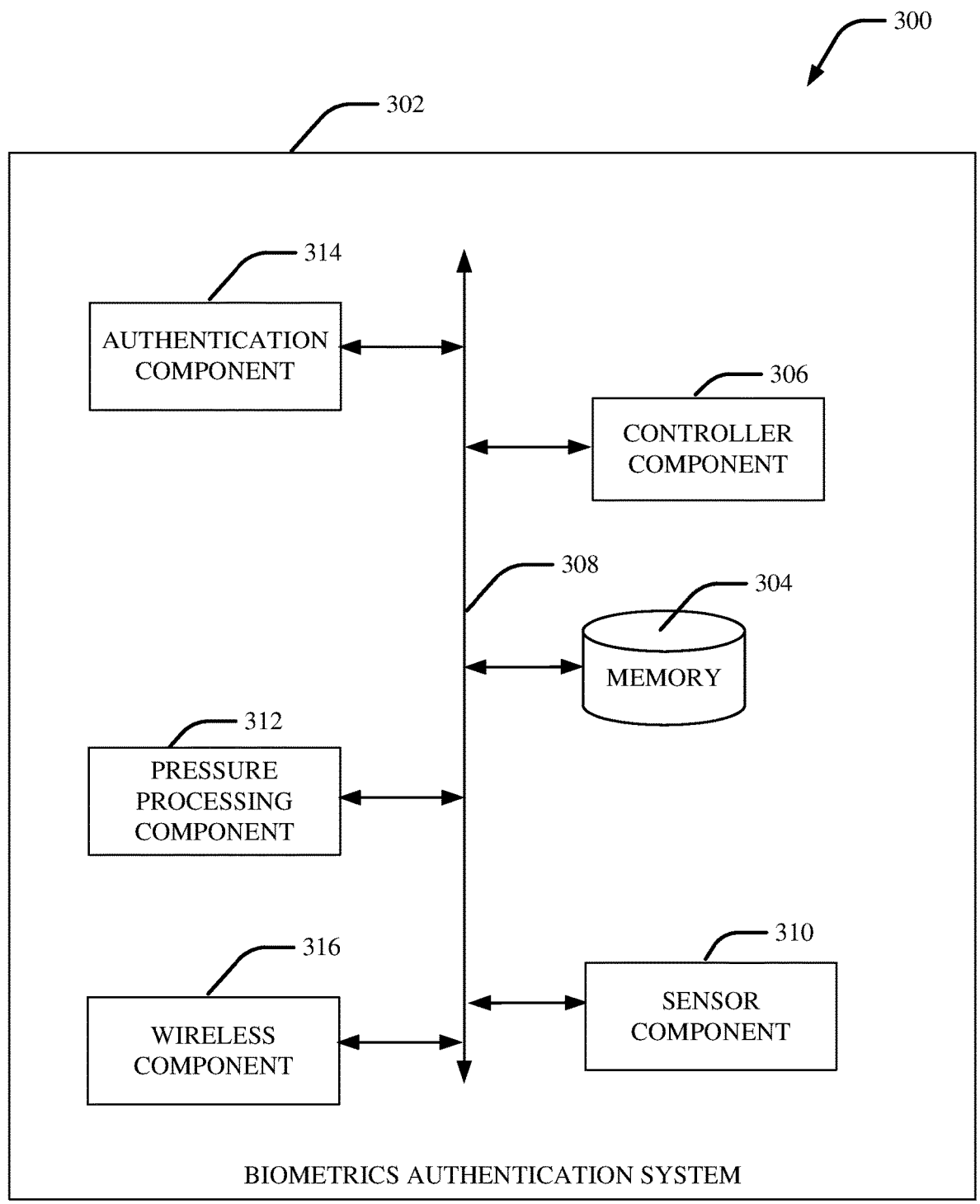
FIG. 3 illustrates a block diagram of an example, non-limiting system that facilitates pressure-sensitive authentication components in accordance with one or more embodiments described herein.

In some embodiments, the sensor module 106 can be electrically and/or wirelessly coupled to the storage module 114. In some embodiments, a sensor module 106 can comprise a sensor substrate 108 (described below) that facilitates the operations of the biometrics authentication system 302 (FIG. 3 discussed below). The sensor substrate 108 can be embedded inside the sensor module 106. In some embodiments, the sensor module 106 can comprise the storage module 114 by way of incorporating components of the storage module 114.

Figure 1B:
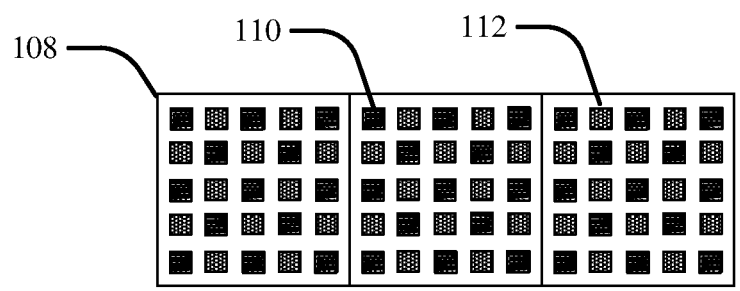
FIG. 1B illustrates an example, non-limiting top view of a sensor substrate in accordance with one or more embodiments described herein.

FIG. 1B illustrates an example, non-limiting top view of the sensor substrate 108 in accordance with one or more embodiments described herein. Repetitive description of like elements employed in respective embodiments is omitted for sake of brevity. According to some embodiments, the sensor substrate 108 can, for example, comprise one or more sensors (e.g., an array of sensors). As depicted, in some embodiments, the sensor substrate 108 can comprise one or more touch sensors 110 and pressure sensors 112. As described below, the touch sensors 110 and pressure sensors 112 can provide electronic signals to the biometrics authentication system 302 (FIG. 3) when actuated. In some embodiments, the one or more pressure sensors 112 can be an electrical contact, wherein the pressure sensors 112 is actuated when pressure is detected and/or connects with an electrical conductive surface (discussed in FIGS. 2A-D).

Figure 2A:
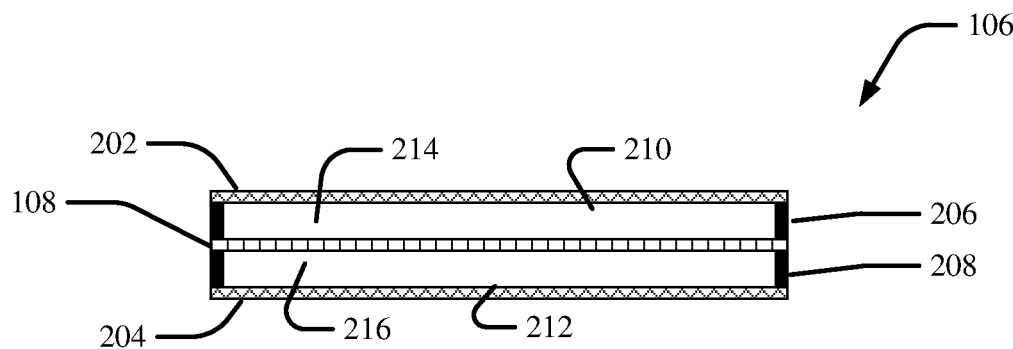
FIG. 2A illustrates an example, non-limiting cross-sectional view of a sensor module in accordance with one or more embodiments described herein.

FIG. 2A illustrates an example, non-limiting cross-sectional view of the sensor module 106 in accordance with one or more embodiments described herein. Repetitive description of like elements employed in respective embodiments is omitted for sake of brevity. According to some embodiments, the sensor module 106 can be constructed by employing a first flexible substrate 202, one or more spacers 206 to form a first gap 214 between the first flexible substrate 202 and the sensor substrate 108. The first flexible substrate 202 can be constructed with a first electrically conductive surface 210 (e.g., patterned with electrical wires). In some embodiments, the sensor module 106 can be further constructed employing a second flexible substrate 204, and one or more spacers 208 to form a second gap 216 between the sensor substrate 108 and the second flexible substrate 204. The second flexible substrate 204 can be constructed with a second electrically conductive surface 212 (e.g., patterned with electrical wires). As depicted, for example, the sensor module 106 is in idle state.

Figure 2B:
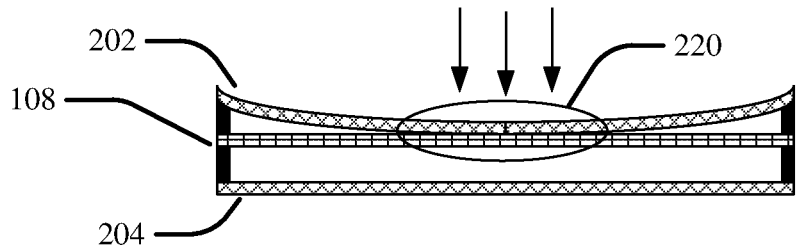
FIG. 2B illustrates an example, non-limiting cross-sectional view of a sensor module in accordance with one or more embodiments described herein.

FIG. 2B illustrates an example, non-limiting cross-sectional view of the sensor module 106 in accordance with one or more embodiments described herein. Repetitive description of like elements employed in respective embodiments is omitted for sake of brevity. According to some embodiments, when pressure is applied (e.g., by user/entity applying pressure on a side (e.g., a top side, in one example embodiment, although other sides are also possible) of the pressure-sensitive device 102, illustrated by arrows), to the first flexible substrate 202, the first flexible substrate 202 can bend downward. When the first flexible substrate 202 bends downward, the first flexible substrate 202 actuates (e.g., the first electrically conductive surface 210 comes into contact with one or more pressure sensors 112) one or more pressure sensors 112 formed on the sensor substrate 108 at 220. In some embodiments, intensity level can be measured by determining a number of pressure sensors 112 that are actuated by the press. For example, the biometrics authentication system 302 determines pressure application value based on number of pressure sensors 112 that are actuated.

Figure 2C:
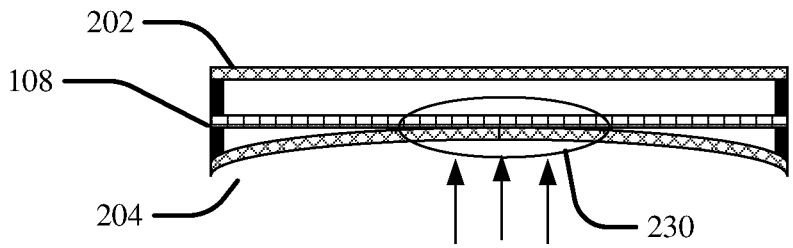
FIG. 2C illustrates an example, non-limiting cross-sectional view of a sensor module in accordance with one or more embodiments described herein.

FIG. 2C illustrates an example, non-limiting cross-sectional view of the sensor module 106 in accordance with one or more embodiments described herein. Repetitive description of like elements employed in respective embodiments is omitted for sake of brevity. According to some embodiments, the pressure sensors 112 can be formed on both sides of the sensor substrate 108. In some embodiments, when pressure is applied (e.g., user/entity applying pressure from the bottom side of the pressure-sensitive device 102, illustrated by arrows) to the second flexible substrate 204, the second flexible substrate 204 bends upward and actuates (e.g., the second electrically conductive surface 212 comes into contact with one or more pressure sensors 112) one or more pressure sensors 112 formed on the sensor substrate 108 at 230. In some embodiments, intensity level can be measured by determining a number of pressure sensors 112 that are actuated by the press.

Figure 2D:
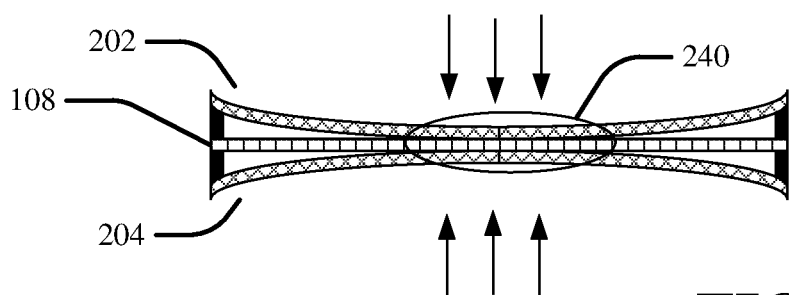
FIG. 2D illustrates an example, non-limiting cross-sectional view of a sensor module in accordance with one or more embodiments described herein.

FIG. 2D illustrates an example, non-limiting cross-sectional view of the sensor module 106 in accordance with one or more embodiments described herein. Repetitive description of like elements employed in respective embodiments is omitted for sake of brevity. According to some embodiments, the pressure sensors 112 can be formed on both sides of the sensor substrate 108. For example, user can apply pressure on both sides (e.g., squeezing the pressure-sensitive device 102 as illustrated by arrows). In such a case, the first flexible substrate 202 and the second flexible substrate 204 bend and actuate one or more pressure sensors 112 at 240. In some embodiments, an intensity level can be measured by determining a number of pressure sensors 112 that are actuated by both the first flexible substrate 202 and the second flexible substrate 204.

It should be appreciated that it is not critical which type of pressure sensor is employed as long as the sensor is capable of coupling with component the biometrics authentication system 302 to facilitate the functions described herein. For example, the sensor module 106 can be constructed using various techniques, for example, but not limited to, micro plates having electrodes to in indicate connection base on application of pressure, or off-the-shelf pressure sensors that are capable of electrically coupling with components the biometrics authentication system 302. In some embodiments, the first flexible substrate 202 and second flexible substrate 204 can be constructed employing a piezoresistive material to detect a press or squeeze of the pressure-sensitive device 102. The piezoresistive substrate can detect a change in electrical resistivity of a semiconductor or metal when strain is applied.

FIG. 3 illustrates a block diagram of an example, non-limiting system 300 that facilitates pressure-sensitive authentication components in accordance with one or more embodiments described herein. Repetitive description of like elements employed in respective embodiments is omitted for sake of brevity. According to some embodiments, the system 300 can comprise a biometrics authentication system 302 accordance with one or more embodiments described herein. In some embodiments, the biometrics authentication system 302 can also include or otherwise be associated with a memory 304, a controller component 306 (also referred to as a "processor") that executes computer executable components stored in a memory 304. The biometrics authentication system 302 can further include a system bus 308 that can couple various components including, but not limited to, a sensor component 310, a pressure processing component 312, an authentication component 314, and a wireless component 316.

Aspects of systems (e.g., the biometrics authentication system 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the biometrics authentication system 302 and the authentication component 314 can comprise various computer and/or computing-based elements described herein with reference to operating environment 900 and FIG. 9. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by the controller component 306, can facilitate performance of operations defined by the executable component(s) and/or instruction(s). For example, the memory 304 can store computer and/or machine readable, writable, and/or executable components and/or instructions that, when executed by the controller component 306, can facilitate execution of the various functions described herein relating to the authentication component 314, the sensor component 310, and/or the wireless component 316.

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 916 and FIG. 9. Such examples of memory 304 can be employed to implement any embodiments of the subject disclosure. In some embodiments, content of the memory 304 can be protected by various authentication system, including the biometrics authentication system 302 described herein.

According to some embodiments, the controller component 306 can comprise one or more types of processors and/or electronic circuitry that can implement one or more computer and/or machine readable, writable, and/or executable components and/or instructions that can be stored on the memory 304. For example, the controller component 306 can perform various operations that can be specified by such computer and/or machine readable, writable, and/or executable components and/or instructions including, but not limited to, logic, control, input/output (I/O), arithmetic, and/or the like. In some embodiments, controller component 306 can comprise one or more central processing unit, multi-core processor, microprocessor, dual microprocessors, microcontroller, System on a Chip (SOC), array processor, vector processor, and/or another type of processor.

In some embodiments, the components of biometrics authentication system 302, for example, the controller component 306, the memory 304, the sensor component 310, the pressure processing component 312, the authentication component 314, and/or the wireless component 316 can be communicatively, electrically, and/or operatively coupled to one another via the bus 308 to perform functions of the biometrics authentication system 302, and/or any components coupled therewith. In several embodiments, the bus 308 can comprise one or more memory bus, memory controller, peripheral bus, external bus, local bus, and/or another type of bus that can employ various bus architectures. Further examples of the bus 308 are described below with reference to a system bus 918 and FIG. 9. Such examples of the bus 308 can be employed to implement any embodiments of the subject disclosure.

In several embodiments, a biometrics authentication system 302 can comprise one or more computer and/or machine readable, writable, and/or executable components and/or instructions that, when executed by the controller component 306, can facilitate performance of operations defined by such component(s) and/or instruction(s). Further, in numerous embodiments, any component associated with the biometrics authentication system 302, as described herein with or without reference to the various figures of the subject disclosure, can comprise one or more computer and/or machine readable, writable, and/or executable components and/or instructions that, when executed by the controller component 306, can facilitate performance of operations defined by such component(s) and/or instruction(s). For example, the authentication component 314, and/or any other components associated with the biometrics authentication system 302 (e.g., communicatively, electronically, and/or operatively coupled with and/or employed by biometrics authentication system 302), can comprise such computer and/or machine readable, writable, and/or executable component(s) and/or instruction(s). Consequently, according to numerous embodiments, the biometrics authentication system 302 and/or any components associated therewith, can employ the controller component 306 to execute such computer and/or machine readable, writable, and/or executable component(s) and/or instruction(s) to facilitate performance of one or more operations described herein with reference to the biometrics authentication system 302 and/or any such components associated therewith.

In some embodiments, the biometrics authentication system 302 can facilitate performance of operations related to and/or executed by the components of biometrics authentication system 302 (e.g., the controller component 306, the memory 304, the sensor component 310, the pressure processing component 312, the authentication component 314, and/or the wireless component 316). For example, as described in detail below, the biometrics authentication system 302 can facilitate: measuring, (e.g., by the sensor component 310), pressure by employing one or more pressure sensors (e.g., 112); determining, (e.g., by pressure processing component 312), a first pressure sequence employed to authenticate a device, wherein the first pressure sequence is determined based on the pressure applied at the one or more pressure sensors; and authenticating, (e.g., by an authentication component 314) the first pressure sequence by determining that the first pressure sequence matches an authentication pressure sequence.

In some embodiments, the sensor component 310 can comprise, but may not be limited to, one or more touch sensors 110 and/or one or more pressure sensors 112. In some embodiments, the sensor component 310 can measure pressure by employing one or more pressure sensors (e.g., 112). For example, an entity (e.g., human and/or user), can hold the pressure-sensitive device 102 and apply pressure (e.g., presses and/or squeezes the pressure-sensitive device 102) which is detected by the pressure sensors 112. The sensor component 310, employing the pressure sensors 112, can measure intensity of the applied press, frequency of presses and/or time of each presses. The pressure sensors 112 of the sensor component 310 can be coupled to the other components of the biometrics authentication system 302, and can communicate the pressure readings (e.g., pressure measurements) to the coupled components for further processing. It should be known that any suitable pressure sensing device that can measure pressure and can communicate the pressure measurements, for example, the one or more pressure sensors 112 (described in FIGS. 1B and 2A-D), can be employed for sensing pressure in accordance with some embodiments described herein.

In some embodiments, the pressure processing component 312 can comprise one or more processors, memory, and electrical circuitry. In some embodiments, the pressure processing component 312 can determines a first pressure sequence (e.g. a series of presses, squeezes, pauses, etc., further described below) used to authenticate the pressure-sensitive device 102. The first pressure sequence, for example, can be determined, but not limited to, based on the pressure applied at the one or more pressure sensors 112. In some embodiments, the first pressure sequence can be a sequence made from measuring number of presses made by the entity, time of each press, intensity of the press (e.g., level of squeeze), and time between presses (e.g., pause between presses). For example, when an entity, squeezes the pressure-sensitive device 102 three times, pauses for one second and squeezes the pressure-sensitive device 102 for three seconds, the pressure processing component 312 determines pressure sequence as "3-press-pause-long press" sequence. In some embodiments, the pressure sequence can comprise a first pressure application value (e.g. number of presses and/or pauses, intensity value of each press), and a first pressure application duration value (e.g., time value for length of time each press was applied). For example, the pressure sequence can be a computer-generated data structure and/or a data table comprising occurrence of each press and associated intensity and time values. For example, a series of "press-press-press," each press less than a second, can be translated to a pressure sequence "3-0" (e.g., the first pressure application value equals 3 and first pressure duration value equals 0).

In some embodiments, the pressure sequence can be any combination of pressures (e.g., presses), taps, pauses and/or extended squeezes. In an embodiment, for example, a first portion of the pressure sequence can be applied while the pressure-sensitive device 102 is unplugged (e.g., part of the pressure sequence applied while the user is holding the pressure-sensitive device 102 in their hand prior to plugging in the pressure-sensitive device 102 to a computer). A second of portion of the pressure sequence can be applied after the pressure-sensitive device 102 is plugged into the computer. Thus, in accordance with the embodiment, the pressure sequence can be in two stages, a first stage can be while the pressure-sensitive device 102 is unplugged and a second stage can be while the pressure-sensitive device 102 is plugged. In an embodiment, the pressure processing component 312 can determine the first portion of the pressure sequence (e.g., the first stage) and the one or more components of the computer (not shown) can determine the second portion of the pressure sequence (e.g., the second stage). In an embodiment, the pressure processing component 312 can determine both the first portion of the pressure sequence (e.g., the first stage) and the second portion of the pressure sequence (e.g., the second stage after plugging in to a computer). The advantage of determining the entire pressure sequence (e.g., first and second portions) is that processing only needs to be perform by one device.

In some embodiments, the pressure sequence is composed of one or more values, for example but not limited to, a pressure strength value (e.g., amount of pressure applied), a pressure application rate value (e.g., how fast the presses were applied), a pressure application duration value (e.g., how long the pressure was applied), a frequency of pressure application value (e.g., how many times the pressure was applied), a connection status value (e.g., plugged or unplugged), and an actuation instrument value (e.g., how many fingers used to apply the pressure).

In some embodiments, the authentication component 314, can comprise one or more processors, memory, and electrical circuitry. In some embodiments, the authentication component 314 can authenticate the first pressure sequence by determining that the first pressure sequence matches an authentication pressure sequence (e.g., user provided password in a form of a pressure sequence). In some embodiments, during securing phase of data stored on the pressure-sensitive device 102 or on the computer, one or more authentication sequences are stored in memory. For example, when certain data or region of the file system needs to be restricted, a security password is first provided and stored, for example, in memory of device and/or computer. In an embodiment, the password can be a pressure sequence (e.g., authentication pressure sequence). For example, in order to access the data, the prestored authentication pressure sequence must be matched. In an embodiment, authentication pressure sequence can be a secondary authentication. For example, the data can be protected with employing various biometric input for each stage of security. For example, first stage authentication can be via retina scan, voice recognition, finger print, and/or alphanumerical password. The second stage authentication can be via biometrics authentication system 302 as disclosed herein.

In some embodiments, artificial intelligence functions can be employed by the authentication component 314 to perform match functions (e.g., comparing the pressure sequence against the predefined authentication pressure sequence). In some embodiments, authentication component 314 can receive a pressure sequence, for example, upon sensor component 310 detecting if there was pressure applied (e.g., at least one of the pressure sensor 112 was actuated). If the pressure sequence is received at the moment authentication is required, the authentication component 314 can attempt to verify the pressure sequence. Otherwise, the pressure sequence is ignored as being accidental press. The authentication component 314 can keep track of the accidental presses to better predict when authentication is required.

In some embodiments, the biometrics authentication system 302 can comprise a wireless component 316 to transmit pressure sequences for authentication by an external or secondary device. For example, once the pressure processing component 312 determines the pressure sequence, the pressure sequence is transmitted to an external device using wireless technology (discussed below). Thereafter, the external device can authenticate and transmit a grant access message to the pressure-sensitive device 102.

In some embodiments, if the pressure sequence fails to match, the authentication component 314 can notify one or more components of the biometrics authentication system 302. In an embodiment, as discussed below, although pressure sequence failed to match, access can be granted to unsecured data. In some embodiments, the user can be offered alternative methods authentication if the pressure sequence continues to fail. For example, after three attempts, the user will be required to provide different source of authentication.

In some embodiments, the wireless component 316 can be wireless processor that can interface with one or more sensor devices and the controller component 306. According to some embodiments, the wireless component 316 can include one or more wireless networks, including, but not limited to, a cellular network, a wide area network (WAN) (e.g., the Internet access through wireless technology) or a local area network (LAN). For example, wireless component 316 can comprise wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 3 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In some embodiments, the wireless component 316 can comprise a transmitter and a receiver for infrared, near-field communication-NFC, Bluetooth, or any suitable wireless communication protocol.

Figure 4:
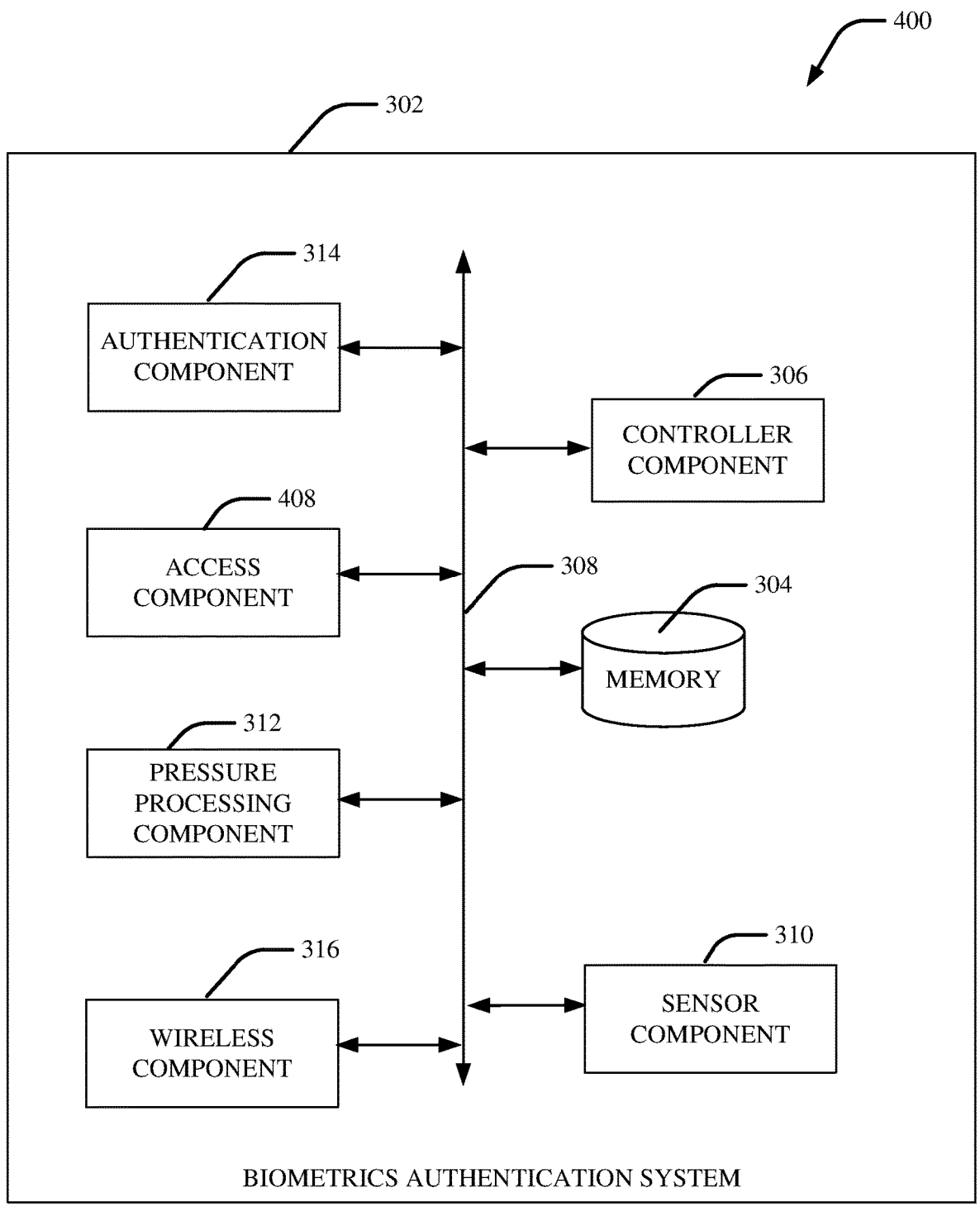
FIG. 4 illustrates a block diagram of an example, non-limiting system that facilitates of the biometrics authentication system components in accordance with one or more embodiments described herein.

FIG. 4 illustrates a block diagram of an example, non-limiting system 400 that facilitates of the biometrics authentication system 302 components in accordance with one or more embodiments described herein. Repetitive description of like elements employed in respective embodiments is omitted for sake of brevity. According to several embodiments, the system 400 can comprise biometrics authentication system 302. In some embodiments, biometrics authentication system 302 can further comprise an access component 408.

In several embodiments, an access component 408 can grant access to protected data stored in the memory if pressure sequence is authenticated. For example, the access component 408 can grant access to protected data stored in memory (e.g., employing a file system) of the pressure-sensitive device 102 or the computer and/or server that connected to the pressure-sensitive device 102. Depending on method employed securing the file system, various levels of access can be granted. In some embodiments, the memory 304 comprises one or more partitions (e.g., data is stored in certain parts of memory having different levels of security and authentication and/or one or more regions on a hard disk or other secondary internal/external storage) for storing data. In some embodiments, the access component 408 can grant access to data from one or more partition of the memory 304 based on a determination that the first pressure sequence is authenticated for access to the one more partition of the memory 304. In some embodiments, although the authentication component 314 can have authenticated the pressure sequence, access may only be granted to a portion of file system. For example, for additional security, certain data can be protected with additional authentication (e.g., additional pressure sequences or biometric verification). In some embodiments, the access component 408 can grant access to unprotected file system if the authentication fails. For example, the pressure sequence did not match the authentication pressure sequence. In this case, access is granted only if other form of authentication is provided (e.g., biometric data or alphamerical password). In some embodiments, the access component 408 can communicate with external devices or evaluate prior failures before granting access if the pressure sequence failed to match. For example, if biometrics authentication system 302 detects that user pressed the pressure-sensitive device 102 one second longer than required.

In some embodiments, the memory 304 of the pressure sensitive device 102 can be partitioned into one or more portions (e.g., parts), wherein secured data may be stored in predefined parts of the memory 304. In some embodiments, the one or more partitions of the memory 304 may be secured using a unique authentication sequence. The access component 408 can grant access to secured partitions (e.g., part of the memory requiring authentication) of the memory 304 based on the type of authentication used for each portion. For example, data can be partitioned into one or more portions and assigned a separate pressure sequence for authentication, wherein access can be granted to one or more portions if the pressure sequence is authenticated. In some embodiments, different pressure sequence can be required for accessing one or more partitions of the memory 304.

In some embodiments, the access component 408 grants incremental access (e.g., access is granted incrementally after each successful authentication one or more security schemes) to one or more partitions of the memory 304 or to a computing system (e.g., external computer and/or electronic device) in response to authenticating the first pressure sequence. In some embodiments, the memory 304 or the computing system comprises one or more partitions wherein authentication of the first pressure sequence can grant access to one or more partitions after one or more security screening have been authenticated. For example, the first pressure sequence is provided after alphanumeric password is provided and authenticated. The advantage is that requiring a pressure sequence in addition to other authentication increases confidence level for the security of the data stored in the memory 304.

Figure 5:
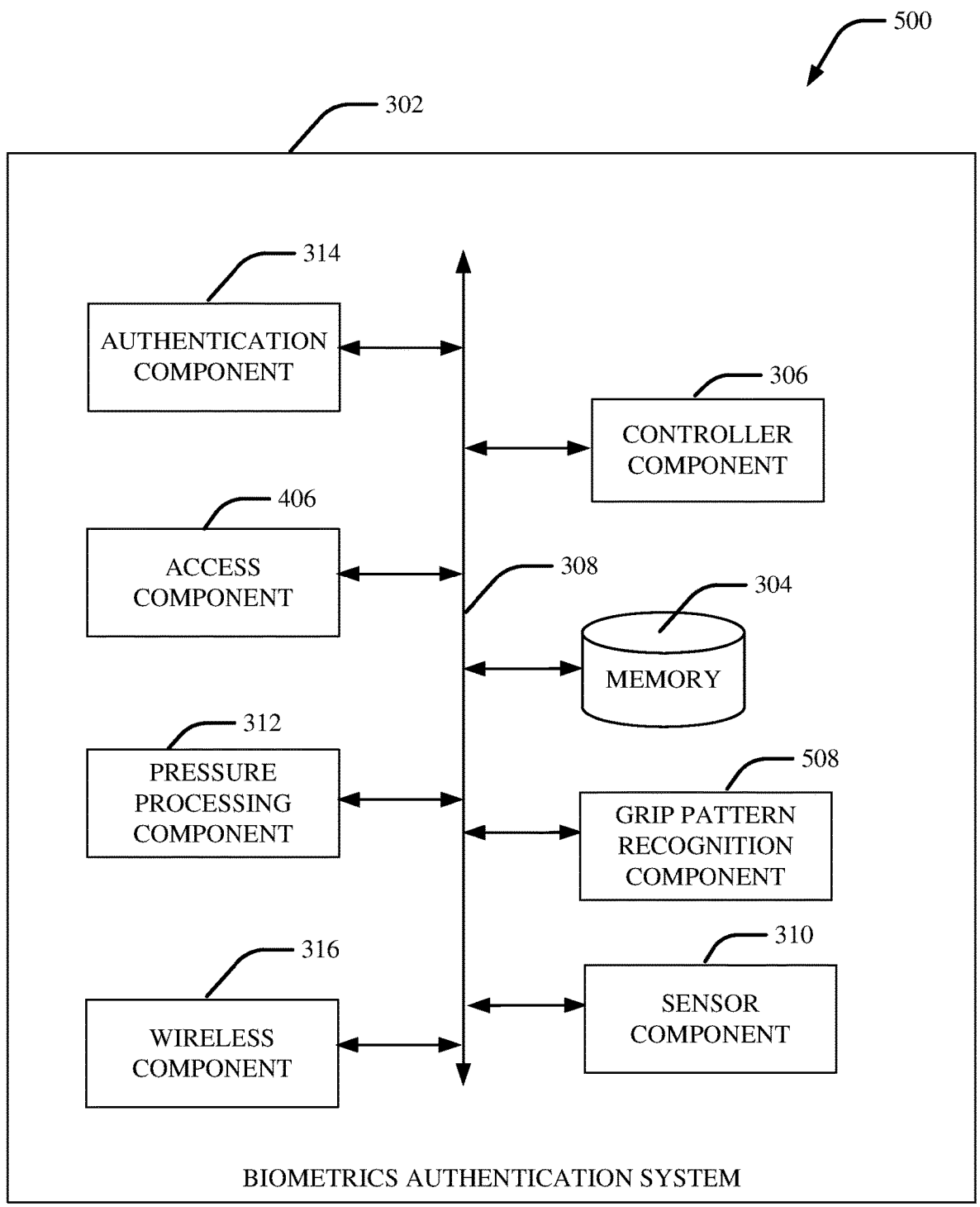
FIG. 5 illustrates a block diagram of an example, non-limiting system that facilitates of the biometrics authentication system components in accordance with one or more embodiments described herein.

FIG. 5 illustrates a block diagram of an example, non-limiting system 500 that facilitates of the biometrics authentication system 302 components in accordance with one or more embodiments described herein. Repetitive description of like elements employed in respective embodiments is omitted for sake of brevity. According to several embodiments, the system 500 can comprise biometrics authentication system 302. In some embodiments, biometrics authentication system 302 can further comprise grip pattern recognition component 508.

In some embodiments, the grip pattern recognition component 508 can recognize a grip pattern of an entity by measuring the pressure applied on the one or more pressure sensors. The grip pattern recognition component 508 can comprise the touch sensors 110 and pressure sensors 112. In some embodiments, the touch sensors 110 and pressure sensors 112 can be distributed on the outer layer (not shown) of the pressure-sensitive device 102. In an embodiment, when the biometrics authentication system 302 detects that a user grabbed the pressure-sensitive device 102, both the touch sensors 110 and pressure sensors 112 can be actuated. In some embodiments, the pressure sequence can be determined based on how the pressure-sensitive device 102 was grabbed/held in conjunction with application of pressure. Thereafter, authentication component 314 can authenticate or reject the pressure sequence.

In some embodiments, grip pattern recognition component 508, employing touch sensors 110 and pressure sensors 112, can recognize various patterns. For example, but not limited to, a grip pattern, directions of swipes, number of fingers used to generate the grip pattern. In some embodiments, access to one or more partitions of the memory 304 or to a computing system is granted in response to authenticating the grip pattern. In some embodiments, access to one or more partitions of the memory 304 or to a computing system is granted in response to authenticating the grip pattern and direction of swipe. For example, after authenticating the grip pattern, access to a first partition of memory is granted if the grip pattern (e.g., swipe) was in first direction and access to a second partition of memory is granted if the swipe was in second direction.

Figure 6:
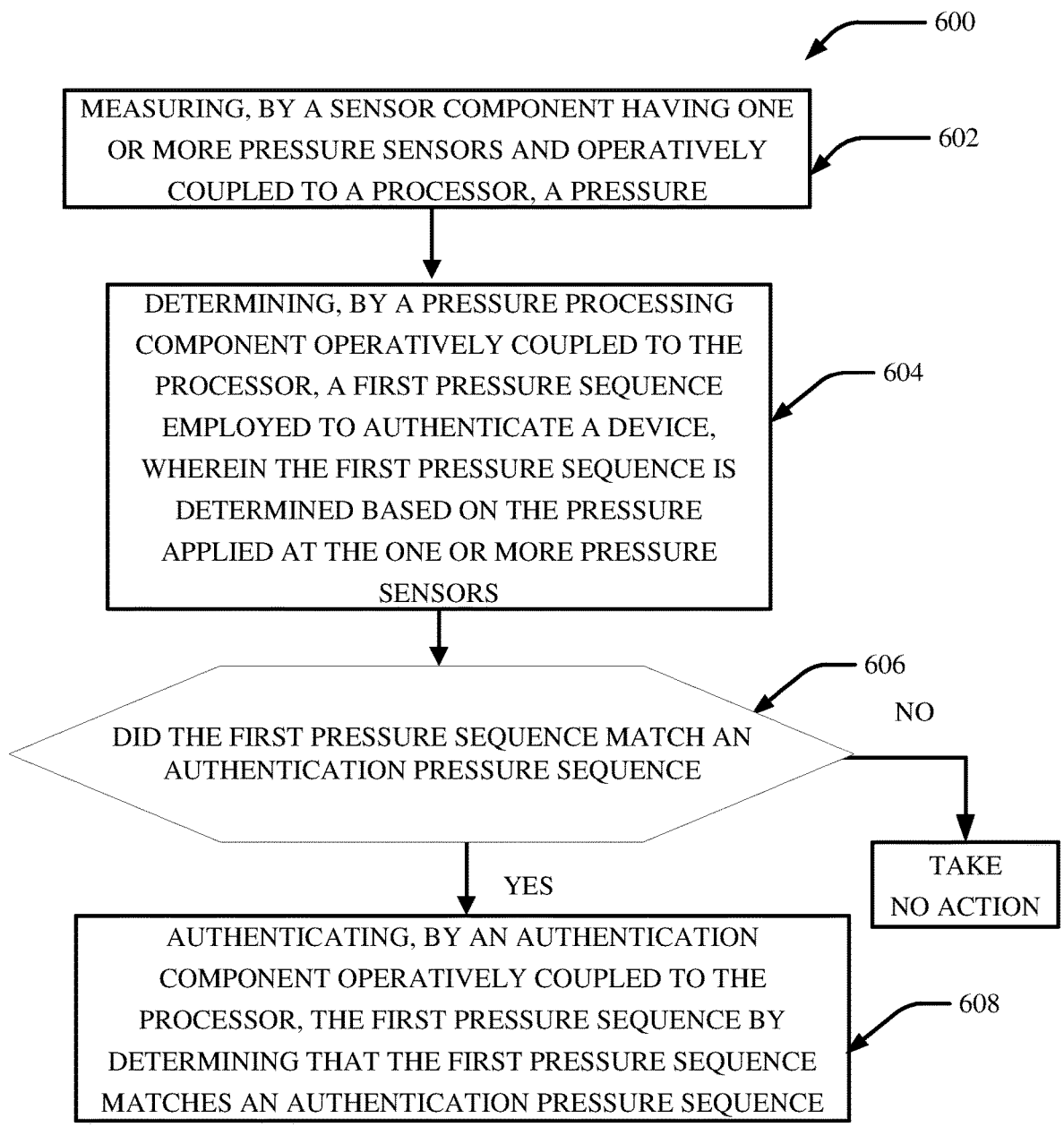
FIG. 6 depicts a diagram of an example, non-limiting computer implemented method that facilitates using the biometrics authentication system accordance with one or more embodiments describe herein.

FIG. 6 depicts a diagram of an example, non-limiting computer implemented method that facilitates using the biometrics authentication system 302 accordance with one or more embodiments describe herein. Repetitive description of like elements employed in other embodiments described herein is omitted for sake of brevity. In some examples, flow diagram 600 can be implemented by operating environment 900 or 100 described below. It can be appreciated that the operations of flow diagram 600 can be implemented in a different order than is depicted.

In non-limiting example embodiments, a computing device (or system) (e.g., computer 912) is provided, the device or system comprising one or more processors and one or more memories that stores executable instructions that, when executed by the one or more processors, can facilitate performance of the operations as described herein, including the non-limiting methods as illustrated in the flow diagrams of FIG. 6. As a non-limiting example, the one or more processors can facilitate performance of the methods by directing or controlling one or more equipment operable to perform semiconductor fabrication.

Operation 602 depicts measuring, by a sensor component 310 having one or more pressure sensors 112 and operatively coupled to a processor 306, a pressure. Operation 604 depicts determining, by a pressure processing component 312 operatively coupled to the processor 306, a first pressure sequence employed to authenticate a device, wherein the first pressure sequence is determined based on pressure applied at the one or more pressure sensors 112. Operation 606 depicts determining if the first pressure sequence matched an authentication pressure sequence. If first pressure sequence matched the authentication sequence, then perform operation 606. Otherwise, continue monitoring. Operation 606 depicts authenticating, by an authentication component 314 operatively coupled to the processor 306, the first pressure sequence by determining that the first pressure sequence matches an authentication pressure sequence.

Figure 7:
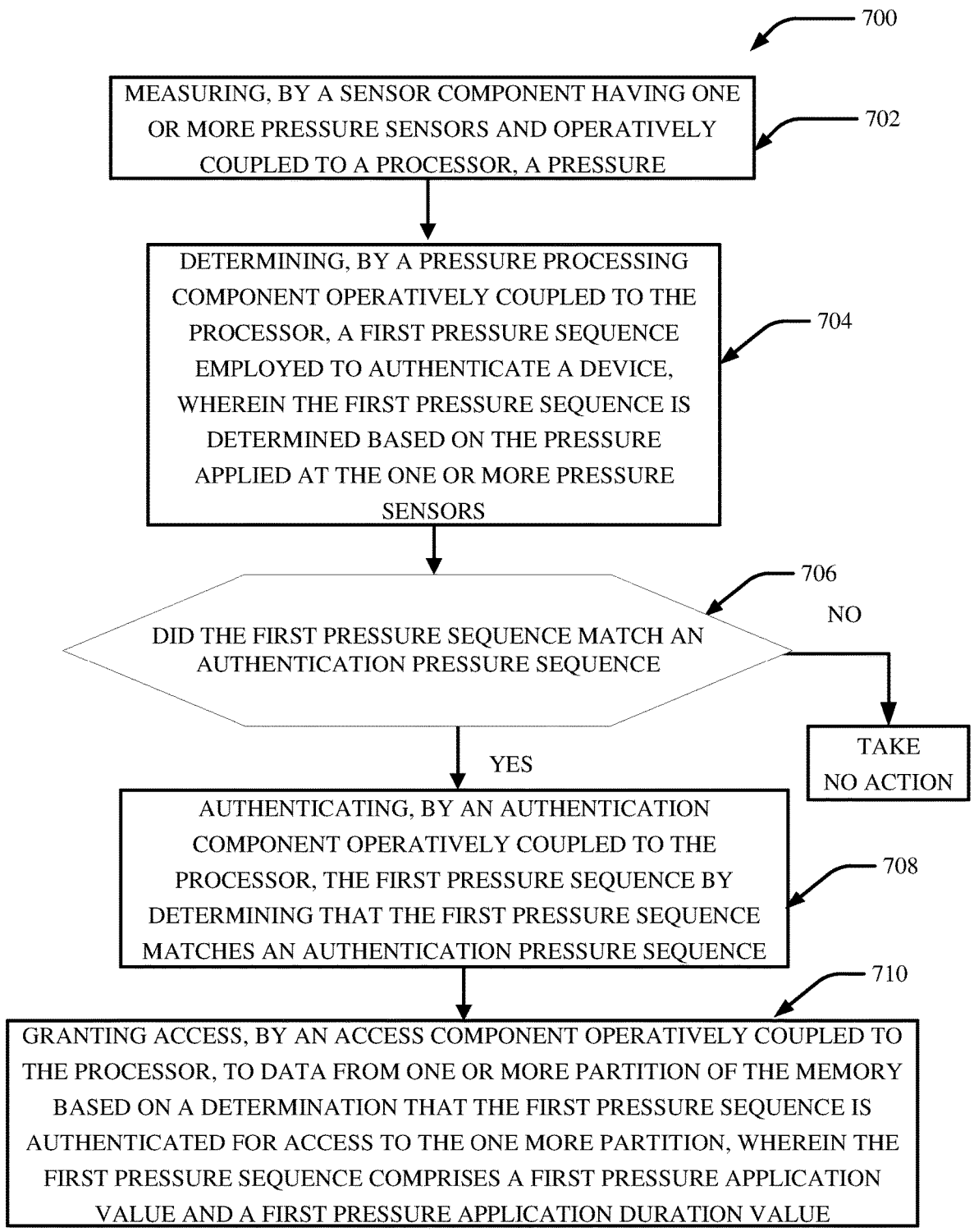
FIG. 7 depicts a diagram of an example, non-limiting computer implemented method that facilitates using the biometrics authentication system accordance with one or more embodiments describe herein.

FIG. 7 depicts a diagram of an example, non-limiting computer implemented method that facilitates using the biometrics authentication system 302 accordance with one or more embodiments describe herein. Repetitive description of like elements employed in other embodiments described herein is omitted for sake of brevity. In some examples, flow diagram 700 can be implemented by operating environment 900 or 100 described below. It can be appreciated that the operations of flow diagram 700 can be implemented in a different order than is depicted.

In non-limiting example embodiments, a computing device (or system) (e.g., computer 912) is provided, the device or system comprising one or more processors and one or more memories that stores executable instructions that, when executed by the one or more processors, can facilitate performance of the operations as described herein, including the non-limiting methods as illustrated in the flow diagrams of FIG. 7. As a non-limiting example, the one or more processors can facilitate performance of the methods by directing or controlling one or more equipment operable to perform semiconductor fabrication.

Operation 702 depicts measuring, by a sensor component 310 having one or more pressure sensors 112 and operatively coupled to a processor 306, a pressure. Operation 704 depicts determining, by a pressure processing component 312 operatively coupled to the processor 306, a first pressure sequence employed to authenticate a device, wherein the first pressure sequence is determined based on pressure applied at the one or more pressure sensors 112. Operation 706 depicts determining if the first pressure sequence matched an authentication pressure sequence. If first pressure sequence matched the authentication sequence, then perform operation 706. Otherwise, continue monitoring. Operation 708 depicts authenticating, by an authentication component 314 operatively coupled to the processor 306, the first pressure sequence by determining that the first pressure sequence matches an authentication pressure sequence. Operation 710 depicts granting access, an access component 316 operatively coupled to a processor 306, to data from one or more partitions of the memory 304 based on a determination that the first pressure sequence is authenticated for access to the one more partitions, wherein the first pressure sequence comprises a first pressure application value and a first pressure application duration value.

Figure 8:
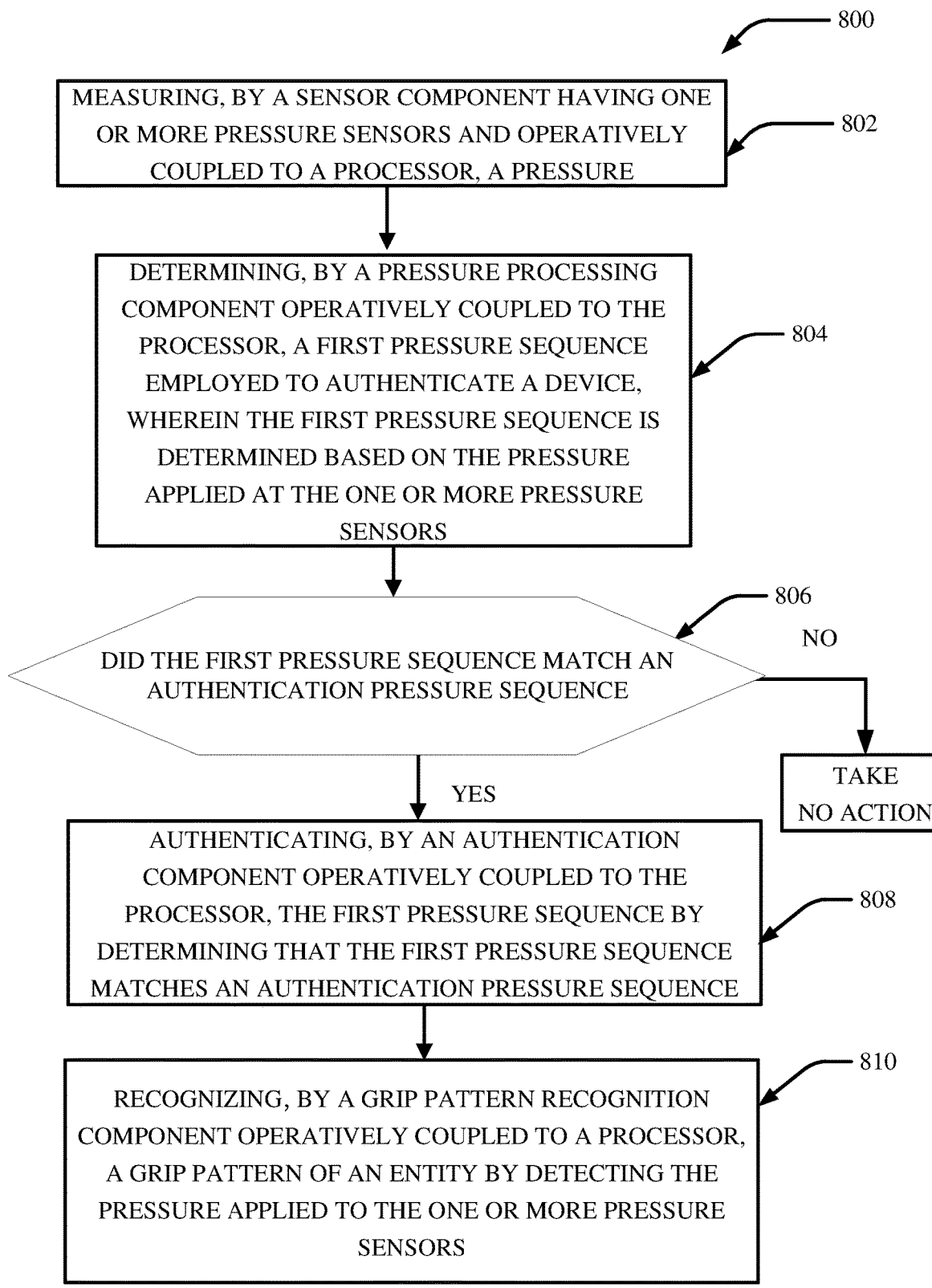
FIG. 8 depicts a diagram of an example, non-limiting computer implemented method that facilitates using the biometrics authentication system accordance with one or more embodiments describe herein.

FIG. 8 depicts a diagram of an example, non-limiting computer implemented method that facilitates using the biometrics authentication system 302 accordance with one or more embodiments describe herein. Repetitive description of like elements employed in other embodiments described herein is omitted for sake of brevity. In some examples, flow diagram 800 can be implemented by operating environment 900 or 100 described below. It can be appreciated that the operations of flow diagram 800 can be implemented in a different order than is depicted.

In non-limiting example embodiments, a computing device (or system) (e.g., computer 912) is provided, the device or system comprising one or more processors and one or more memories that stores executable instructions that, when executed by the one or more processors, can facilitate performance of the operations as described herein, including the non-limiting methods as illustrated in the flow diagrams of FIG. 8. As a non-limiting example, the one or more processors can facilitate performance of the methods by directing or controlling one or more equipment operable to perform semiconductor fabrication.

Operation 802 depicts measuring, by a sensor component 310 having one or more pressure sensors 112 and operatively coupled to a processor 306, a pressure. Operation 804 depicts determining, by a pressure processing component 312 operatively coupled to the processor 306, a first pressure sequence employed to authenticate a device, wherein the first pressure sequence is determined based on pressure applied at the one or more pressure sensors 112. Operation 806 depicts determining if the first pressure sequence matched an authentication pressure sequence. If first pressure sequence matched the authentication sequence, then perform operation 806. Otherwise, continue monitoring. Operation 808 depicts authenticating, by an authentication component 314 operatively coupled to the processor 306, the first pressure sequence by determining that the first pressure sequence matches an authentication pressure sequence. Operation 810 depicts recognizing, by a grip pattern recognition component 318 operatively coupled to a processor 306, a grip pattern of an entity by detecting the pressure applied on the one or more pressure sensors.

Figure 9:
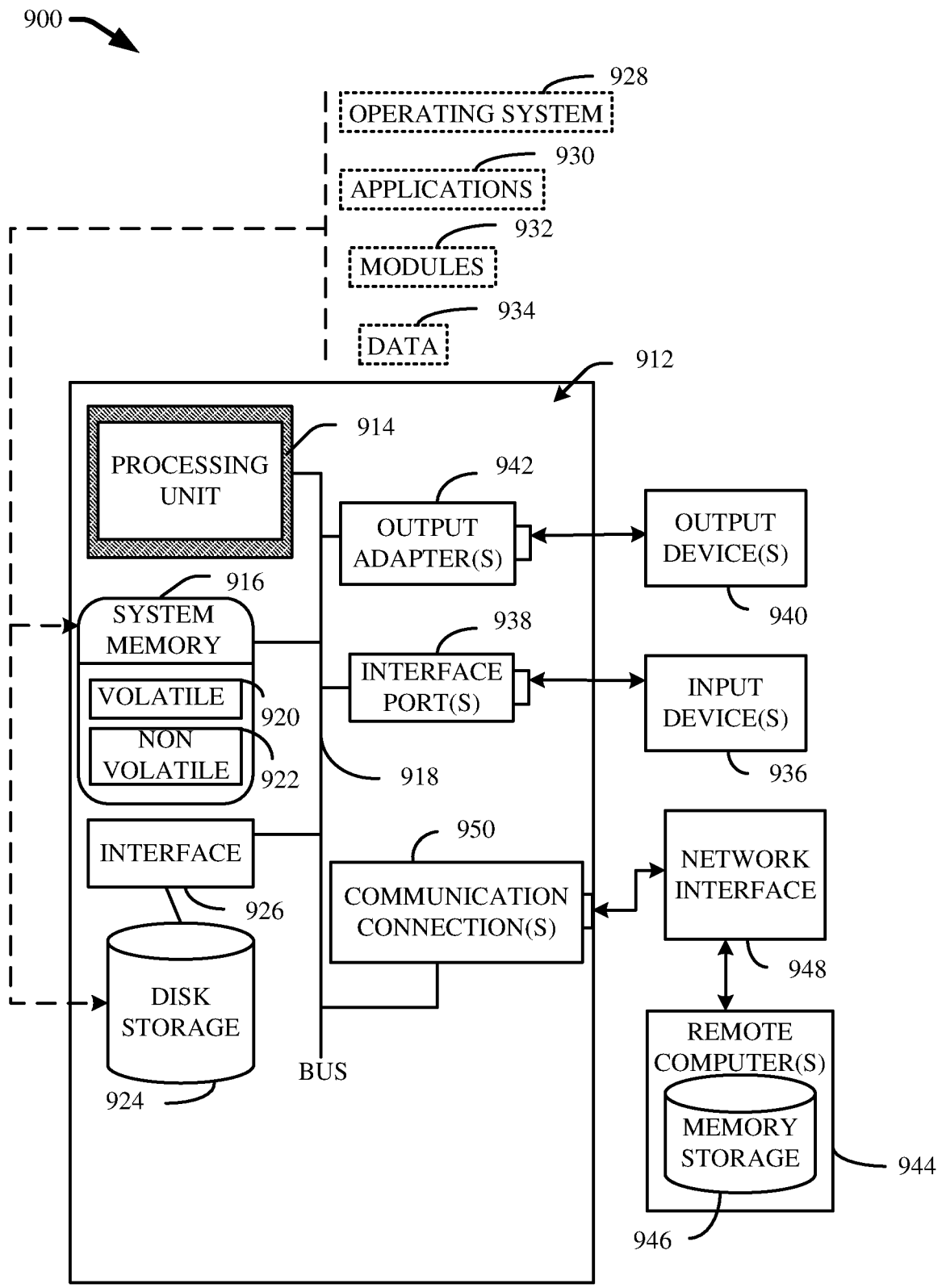
FIG. 9 illustrates a block diagram of an example, non-limiting operating environment in which one or more embodiments described herein can be facilitated.

To provide context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

A suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 994), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 901. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device or other common network node and the like, and typically can also include many or all the elements described relative to computer 912. For purposes of brevity, only a memory storage device 946 is illustrated with remote computer(s) 944. Remote computer(s) 944 is logically coupled to computer 912 through a network interface 948 and then physically coupled via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present innovation can be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be coupled to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
   a memory that stores computer executable components;
   a processor that executes the computer executable components;
   a sensor component comprising one or more pressure sensors that measure a pressure;
   a pressure processing component that determines a first pressure sequence employed to authenticate the device, wherein the first pressure sequence is determined based on the pressure applied at the one or more pressure sensors;
   a grip pattern recognition component that recognizes a grip pattern of an entity by measuring the pressure applied to the one or more pressure sensors; and
   an authentication component that authenticates the first pressure sequence by determining that the first pressure sequence matches an authentication pressure sequence and grants access to one or more partitions of the memory or to a computing system in response to authenticating the grip pattern based on the determining that the first pressure sequence matches the authentication pressure sequence, wherein the memory comprises a first partition and a second partition, and access to the first partition is granted if the grip pattern is in a first direction and access to the second partition is granted if the grip pattern is in a second direction.

2. The device of claim 1, further comprising:
   an access component that grants access to data from the one or more partitions of the memory based on a determination that the first pressure sequence is authenticated for accessing the one or more partitions, wherein the first pressure sequence comprises a first pressure application value and a first pressure application duration value.

3. The device of claim 2, wherein the access component grants access incrementally, according to a plurality of security schemes, to the one or more partitions of the memory or to the computing system in response to authenticating the first pressure sequence; and wherein the first pressure sequence is composed of one or more values selected from a group consisting of: a pressure strength value, a pressure application rate value, a pressure application duration value, a frequency of pressure application value, a connection status value, and an actuation instrument value.

4. The device of claim 1, wherein the authentication component employs the authentication pressure sequence, and wherein the authentication pressure sequence comprises a first pressure authentication value and a first pressure authentication duration value.

5. The device of claim 1, wherein the first pressure sequence is composed of one or more values selected from a group consisting of: a pressure strength value, a pressure application rate value, a pressure application duration value, a frequency of pressure application value, a connection status value, and an actuation instrument value.

6. The computer program product of claim 1, wherein the grip pattern represents a swipe.

7. The computer program product of claim 1, wherein the grip pattern represents a squeeze.

8. A computer-implemented method, comprising:
   measuring, by a system having one or more pressure sensors and operatively coupled to a processor, a pressure;
   determining, by the system, a first pressure sequence employed to authenticate a device, wherein the first pressure sequence is determined based on the pressure applied at the one or more pressure sensors;
   recognizing, by the system, a grip pattern of an entity by detecting the pressure applied to the one or more pressure sensors;
   authenticating, by the system, the first pressure sequence by determining that the first pressure sequence matches an authentication pressure sequence; and
   granting, by the system, access to one or more partitions of a memory in response to authenticating the grip pattern based on the determining that the first pressure sequence matches the authentication pressure sequence, wherein the memory comprises a first partition and a second partition, and access to the first partition is granted if the grip pattern is in a first direction and access to the second partition is granted if the grip pattern is in a second direction.

9. The computer-implemented method of claim 8, further comprising:
grunting, by the system, access to data from the one or more partitions of the memory based on a determination that the first pressure sequence is authenticated for access to the one or more partitions, wherein the first pressure sequence comprises a first pressure application value and a first pressure application duration value.

10. The computer-implemented method of claim 9, wherein the access is granted incrementally, according to a plurality of security schemes, to the one or more partitions of the memory or to the computing system in response to authenticating the first pressure sequence; and wherein the first pressure sequence is composed of one or more values selected from a group consisting of: a pressure strength value, a pressure application rate value, a pressure application duration value, a frequency of pressure application value, a connection status value, and an actuation instrument value.

11. The computer-implemented method of claim 8, wherein the authenticating the first pressure sequence comprises employing the authentication pressure sequence, and wherein the authentication pressure sequence comprises a first pressure authentication value and a first pressure authentication duration value.

12. The computer-implemented method of claim 11, wherein the authenticating the first pressure sequence comprises employing the authentication pressure sequence, and wherein the authentication pressure sequence comprises a plurality of pressure authentication values and a plurality of pressure authentication duration values.

13. The computer-implemented method of claim 8, wherein the grip pattern represents a swipe.

14. The computer-implemented method of claim 8, wherein the grip pattern represents a squeeze.

15. A computer program product for authenticating a device by measuring pressure applied on the device, the computer program product comprising a computer readable storage medium having program instructions embodied therewith, the program instructions executable by a processor to cause the processor to:
measure pressure, by the processor, employing one or more pressure sensors;
determine, by the processor, a first pressure sequence employed to authenticate the device, wherein the first pressure sequence is determined based on the pressure applied at the one or more pressure sensors;
recognize, by the processor, a grip pattern of an entity by detecting the pressure applied on the one or more pressure sensors;
authenticate, by the processor, the first pressure sequence by determining that the first pressure sequence matches an authentication pressure sequence; and
granting, by the processor, access to one or more partitions of a memory in response to authenticating the grip pattern based on the determining that the first pressure sequence matches the authentication pressure sequence, wherein the memory comprises a first partition and a second partition, and access to the first partition is granted if the grip pattern is in a first direction and access to the second partition is granted if the grip pattern is in a second direction.

16. The computer program product of claim 15, further comprising:
grant, by the processor, access to data from the one or more partitions of the memory based on a determination that the first pressure sequence is authenticated for access to the one or more partitions, wherein the first pressure sequence comprises a first pressure application value and a first pressure application duration value.

17. The computer program product of claim 16, wherein the access is granted incrementally, according to a plurality of security schemes, to the one or more partitions of the memory or to the computing system in response to authenticating the first pressure sequence; and wherein the first pressure sequence is composed of one or more values selected from a group consisting of: a pressure strength value, a pressure application rate value, a pressure application duration value, a frequency of pressure application value, a connection status value, and an actuation instrument value.

18. The computer program product of claim 15, wherein the first pressure sequence employs the authentication pressure sequence, and wherein the authentication pressure sequence comprises a first pressure authentication value and a first pressure authentication duration value.

19. The computer program product of claim 15, wherein the authentication pressure sequence comprises a plurality of pressure authentication values and a plurality of pressure authentication duration values.

20. The computer program product of claim 15, wherein the grip pattern is a swipe.

* * * * *